UNITED STATES PATENT OFFICE.

FRIEDRICH WENDLING, OF MUNICH, BAVARIA, GERMANY.

MIXED PAINT.

SPECIFICATION forming part of Letters Patent No. 346,336, dated July 27, 1886.

Application filed January 4, 1886. Serial No. 187,598. (Specimens.)

*To all whom it may concern:*

Be it known that I, FRIEDRICH WENDLING, of Munich, Bavaria, Germany, have invented a new and Improved Paint, of which the following specification is a full, clear, and exact description.

This invention relates to a composition to be mixed with paint, in order to render the same impervious to the action of air and water.

The invention consists in the elements of improvement hereinafter more fully pointed out.

The composition consists of the following ingredients: thirty parts of basic silicate of potassium or sodium; fifteen to twenty-five parts of fluoride of calcium; ten parts of cryolite; ten to fifteen parts of marble or silicate of magnesium; fifteen to twenty parts of basic carbonate of calcium; ten parts of phosphate of calcium. These substances are finely powdered and thoroughly intermixed. The composition is added to the paint, which must be of a nature to resist the action of hydroxide of potassium and hydroxide of calcium. For one hundred parts of the composition are taken about fifty parts of the paint, and the mixture is passed through a fine sieve. To prepare the paint thus obtained for use, there is added slaked lime in the proportion of about one part of paint to two parts of lime. The whole mass is then mixed in sufficient water to obtain the proper consistence, after which the mass is passed through a sieve.

The process of painting is the same as in ordinary whitewashing.

To harden the paint after application it is brushed over with water after twenty-four hours, or after being dry. If hot water is employed, the hardening of the paint is considerably accelerated. The same effect is produced by the influence of the rain and moisture. To obtain an extraordinary degree of hardness of the paint, which will resist even a strong mechanical influence, there is added to the water which is employed to moisten the paint, about fifteen per centum of dissolved basic silicate of potassium or sodium.

The process of hardening consists, essentially, in the formation of silicate of calcium—that is, of those combinations which arise if carbonate of calcium is exposed to the influence of dissolved silicate of potassium or sodium. The carbonic acid in the air reacts on the basic silicate of calcium, transferring the silicic acid to the hydroxide of calcium. Besides, the carbonic acid combines slowly with the hydroxide of calcium added in the form of powder, liberating water, which, in turn, reacts to dissolve new parts of the silicate of potassium. Another process takes place by the reaction of the cryolite on the hydroxide of calcium, forming finely-divided fluoxide of calcium, which is bound by the silicate of potassium or sodium. As the principal transformations take place only very slowly under the gradual influence of the carbonic acid in the air and of moisture, the paint will only obtain its final form and hardness after some time.

The paint prepared in the above-described manner is impervious to air and water, has a handsome appearance, and may be cheaply produced.

I claim as my invention—

A composition of matter adapted to be mixed with paint, and consisting of silicate of potassium, fluoxide of calcium, cryolite, marble, basic carbonate of calcium, and phosphate of calcium, substantially as and in the proportions specified.

FRIEDRICH WENDLING.

Witnesses:
   GUST. ALTHEIMER,
   G. DEDRENY.